May 16, 1967 — R. E. MORGAN — 3,320,519
SILICON CONTROL SWITCH-SATURABLE TRANSFORMER
CURRENT LIMIT PROTECTIVE CIRCUIT
Filed April 13, 1964 — 8 Sheets-Sheet 1

Inventor:
Raymond E. Morgan,
by Charles W. Hefzer
His Attorney.

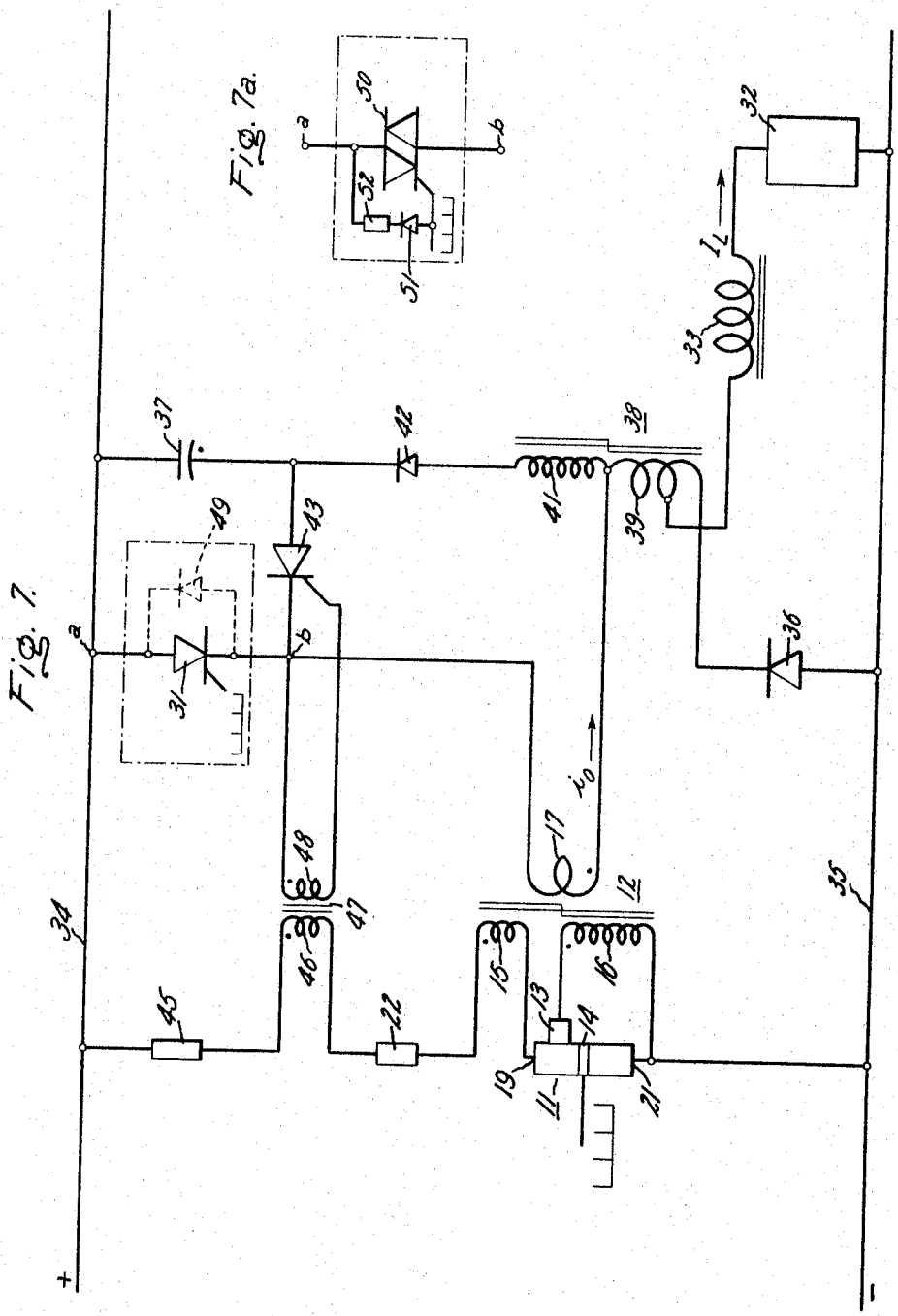

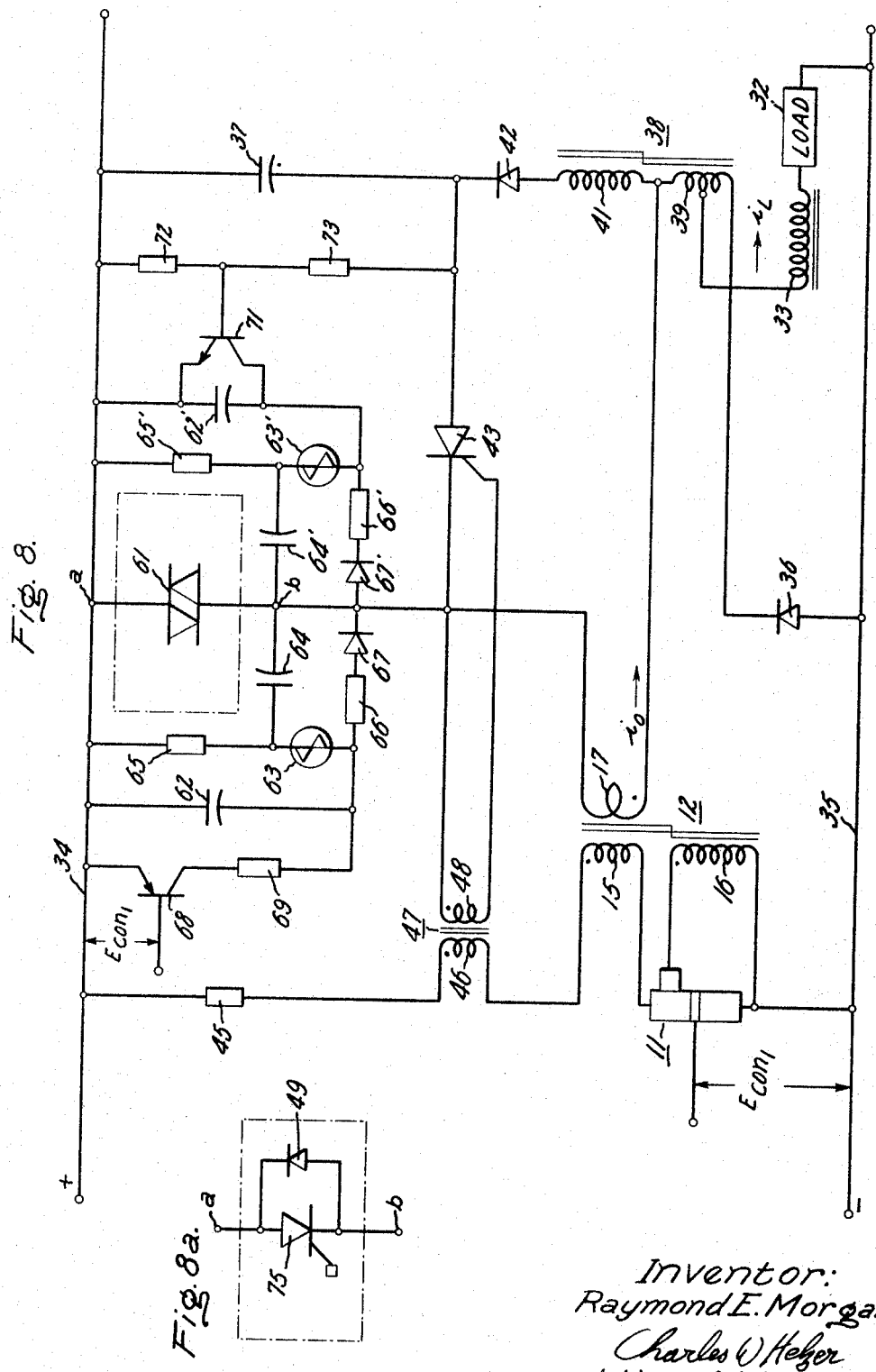

Inventor:
Raymond E. Morgan.
by Charles W. Helzer
His Attorney.

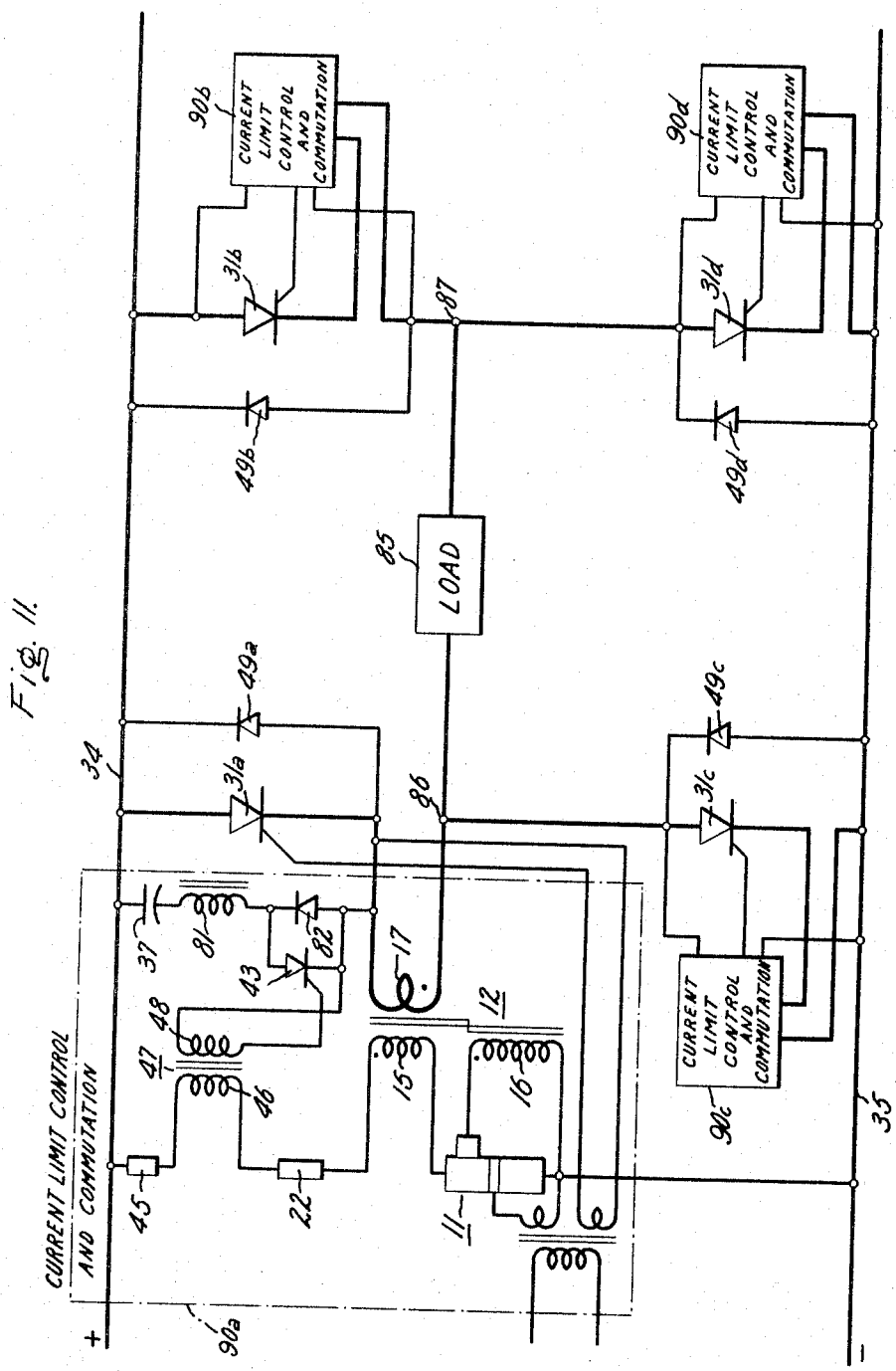

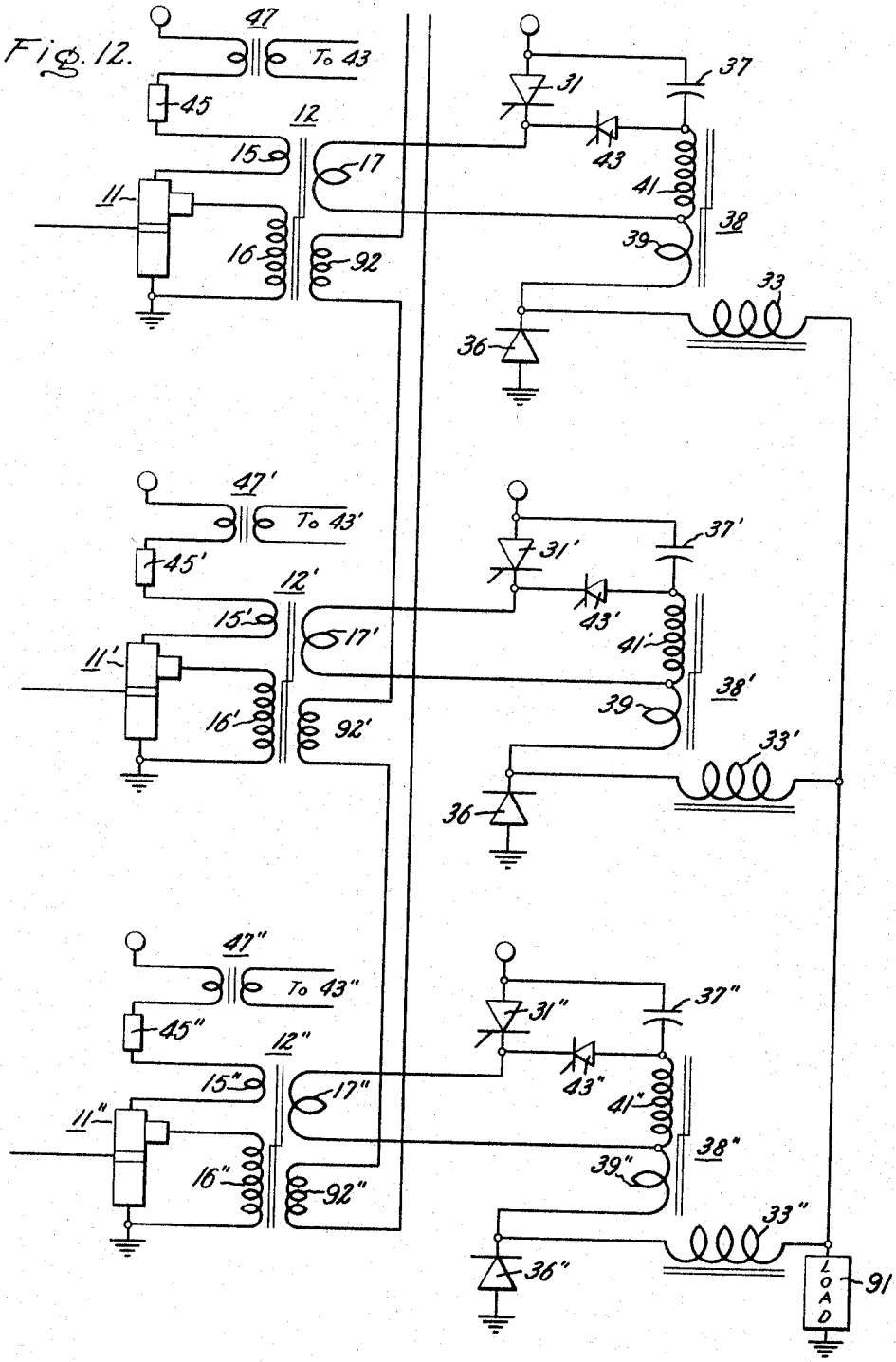

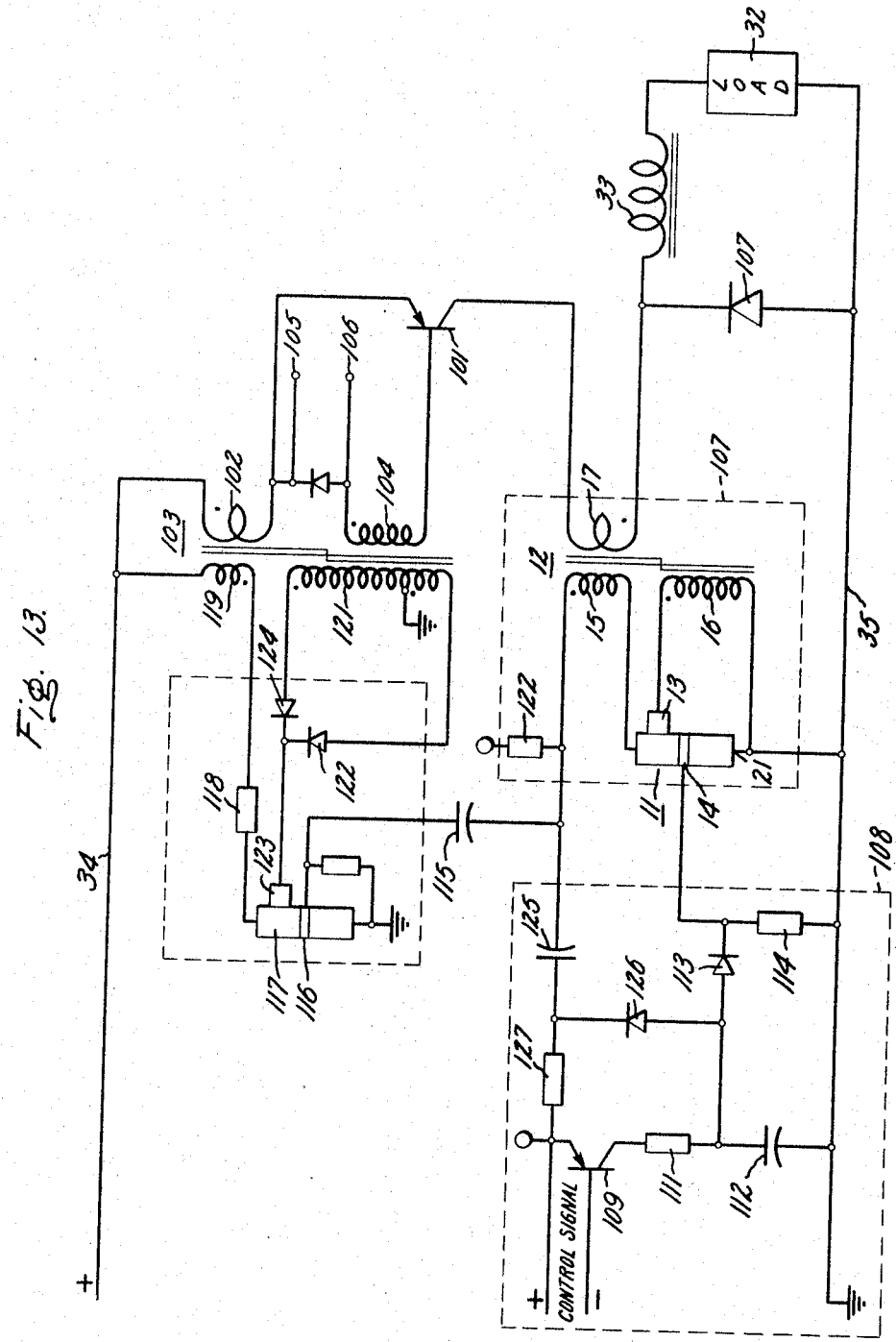

United States Patent Office 3,320,519
Patented May 16, 1967

3,320,519
SILICON CONTROL SWITCH-SATURABLE
TRANSFORMER CURRENT LIMIT PROTECTIVE CIRCUIT
Raymond E. Morgan, Schenectady, N.Y., assignor to General Electric Company, a corporation of New York
Filed Apr. 13, 1964, Ser. No. 359,148
12 Claims. (Cl. 323—22)

This invention relates to a high speed current limit protective circuit.

More particularly, the invention relates to a high speed current limiting circuit for power semiconductors which is economical in operation, and can be insulated from the power circuit which it protects.

With the increasing number of power circuits employing semiconductor devices such as the silicon controlled rectifier, the triac and the diac as a power switching element, and the larger power ratings of such devices, it becomes mandatory to provide fast acting overcurrent protection for such devices to prevent their being damaged. In addition to being fast acting, it is necessary that the current limiting protective circuit be efficient in operation. It is also desirable that the current limiting protective circuit be insulated from the power circuit it protects insofar as possible.

It is therefore a primary object of the present invention to provide a new and improved fast acting current limit circuit for use in protecting power circuits, and semiconductor power circuits in particular.

A further object of the invention is to provide a new and improved fast acting current limiting protective circuit which is simple and relatively inexpensive to manufacture, and efficient in operation.

A still further object of the invention is to provide a current limiting protective circuit having the above characteristics which can be effectively isolated from the larger currents flowing in the power circuit which it protects.

In practicing the invention a current switch is provided which includes in combination a silicon control switch having two load terminals, a turn-on gate and a hold-on gate. The silicon control switch is operatively coupled to saturable core transformer coupling means having at least inductively coupled primary and secondary windings with the primary winding being connected in series circuit relationship with the load terminals of the silicon control switch. The series circuit thus comprised is connected across a source of supply electric potential, the secondary winding of the saturable core transformer coupling means is operatively coupled to the hold-on gate of the silicon control switch, and a gating signal source is operatively coupled to the turn-on gate of the silicon control switch. In a preferred embodiment of the invention the saturable core transformer coupling means includes a reset winding which is comprised by a single turn load current carrying conductor connected in the power circuit to be protected so that current flowing in the single turn load current carrying conductor controls operation of the silicon control switch.

Other objects, features and many of the attendant advantages of this invention will be appreciated more readily as the same becomes better understood by the reference to the following detailed description when considered in connection with the accompanying drawings, wherein like parts in each of the several figures are identified by the same reference character, and wherein:

FIGURE 7 is a detailed schematic diagram of a new and improved time ratio control power circuit employing the new and improved current limit protective circuit made available by the present invention;

FIGURE 7a is a schematic illustration of an alternative form of the circuit arrangement shown in FIGURE 7 which employs a triac power switching element;

FIGURE 8 is a detailed schematic diagram of a new and improved time ratio control power circuit which employs a diac switching element and the new and improved current limiting protective circuit constructed in accordance with the present invention;

FIGURE 8a is a schematic illustration of an alternative arrangement of the circuit arrangement shown in FIGURE 8 which employs a $dv/dt$ fired SCR power switching element;

FIGURE 11 is a schematic circuit diagram of a new and improved power inverter which employs the novel current limit protective circuit constructed in accordance with the present invention;

FIGURE 12 illustrates a three phase time ratio control power circuit using the new and improved current limit protective circuit made available by the present invention; and FIGURE 13 is a schematic circuit diagram of a new and improved transistor time ratio control power circuit which employs the novel current limit protective circuit of the present invention;

Figure 1:
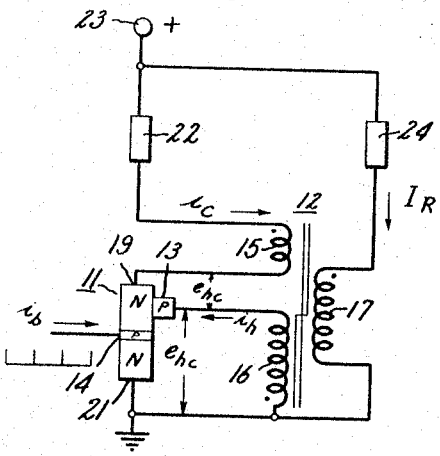
FIGURE 1 is a schematic circuit diagram of a new and improved current limit protective circuit constructed in accordance with the present invention.

In the circuit arrangement of FIGURE 1 a silicon control switch 11 is shown connected to a saturable core transformer 12. The silicon control switch 11 is a four layer (PNPN) semiconductor device which has all four layers accessible for connection to electric operating potentials. For a more detailed description of the construction and operation of the silicon control switch, reference is made to the Transistor Manual (Sixth Edition) edited and published by the Semiconductor Products Department of the General Electric Company located at Electronics Park, Syracuse, N.Y.

In the current limiting protective circuit described herein, the silicon control switch 11 is used as an NPN transistor with a hold-on gate 13 added. With the holding lead of the silicon control switch 11 open circuited, the collector, base and emitter of the silicon controlled switch operates as a conventional NPN junction transistor. If a holding current $i_h$ is applied to the hold-on gate 13 after the silicon control switch 11 has been turned on by the application of a turn-on gating signal $i_b$ to its turn-on gate 14, then the turn-on current $i_b$ can be removed, and the silicon control switch 11 will remain on. However, if the holding current $i_h$ is removed from the hold-on gate 13, and the turn-on signal $i_b$ is removed from the turn-on gate 14, the silicon control switch 11 turns off, and its collector current $i_c$ will be reduced to zero. An unusual characteristic of the silicon control switch 11 is the rather wide range of values that the holding current $i_h$ may assume while the silicon control switch 11 is in the on condition. Another very desirable characteristic of the silicon control switch 11 is the very small value of the turn-on current $i_b$ required to switch it from its non-conducting blocking condition to its conducting condition. It has been determined that a turn-on current $i_b$ having a value of one microampere applied for a period of about 5/10 of a microsecond will turn on the silicon control switch 11. The holding current as $i_h$ can be as small as $i_h = .01 \ i_c$ and may be as large as $i_h = 10 \ i_c$ where $i_c$ is the collector current. With the holding current $i_h$ equal to 5/10 of a milliampere, the collector current $i_c$ may vary from $i_c = 0$ to $i_c = 50$ milliamperes. Conversely, the holding current $i_h$ may vary from a value of $i_h$ equal to 5/10 of a milliampere to $i_h$ equal to 500 milliamperes while the silicon control switch 11 is in its conducting condition, without disturbing the load circuit in which the silicon control siwtch 11 is included. In continuous operation, the holding current $i_h$ can remain at a value of $i_h$ equal to 100 milliamperes continuously without risking damage to the silicon control switch 11. Another characteristic of the silicon control switch 11 which makes it a particularly good switching device for use with the saturable transformer timing circuit is its relatively constant hold-emitter voltage $e_{he}$ when the silicon control switch 11 (hereinafter referred to as SCS 11) is turned on. Also the hold collector voltage $e_{hc}$ is relatively high (approximately $e_{hc} = 40$ volts) when the SCS 11 is in its off or nonconducting blocking condition so as to permit a fast reset of a saturable core transformer such as a 12 used in conjunction with the SCS. In connection with the above description of the characteristics of the silicon control switch 11, it should be kept in mind that particular current values recited relate to a particular silicon control switch, and that other silicon control switches may be designed readily having different values for the characteristics cited. However, the general characteristics of the silicon controlled switch 11 such as that of accommodating a wide range of holding current values will be common to all silicon control switch designs.

Figure 4:
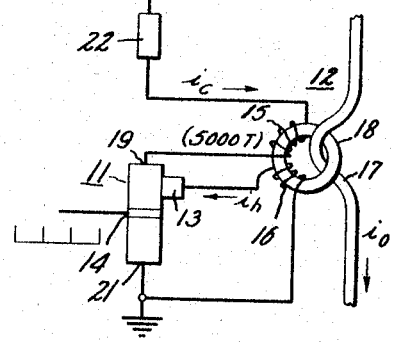
FIGURE 4 is a modified form of the circuit shown in FIGURE 1 illustrating a preferred manner of its construction.

The saturable core transformer 12 has a primary winding 15, a secondary winding 16 and a reset winding 17 all of which are inductively coupled through a common magnetizable core such as the toroidal core member 18 shown in the circuit arrangement of FIGURE 4 of the drawings. The toroidal core member 18 is fabricated from a magnetizable material such as "permalloy" manufactured and sold by the Arnold Engineering Company. The primary winding 15 of the saturable core transformer 12 is connected in series circuit relationship with a current limiting resistor 22 and the load terminals 19 and 21 of the silicon control switch 11, and the series circuit thus comprised is connected across a source of direct current electric potential applied between the terminal 23 and ground. Since the load terminal 19 can also be said to operate as a collector and the load terminal 21 can be said to operate as an emitter, the primary winding portion 15 of the saturable core transformer 12 and resistor 22 can also be said to be connected in series circuit relationship with the emitter-collector circuit of SCS 11.

The primary winding 15 of saturable core transformer 12 is inductively coupled to the secondary winding 16 which is connected between the holding gate 13 and the load terminal or emitter 21 of SCS 11. Hence, when a collector current $i_c$ flows in the primary winding 15, a hold current $i_h$ will be induced in the secondary winding 16 which is supplied to the hold gate 13 of SCS 11 to hold the device on. In addition to primary winding 15 and secondary winding 16, the reset winding 17 is wound on the common core member 18. The reset winding 17 is operatively connected between the terminal 23 of the source of direct electric potential through a limiting resistor 24 and the load terminal 21 of SCS 11. By this arrangement, a reset current $I_R$ will always flow in the reset winding 17 which tends to keep the saturable core of the saturable core transformer 12 driven into negative saturation where negative saturation is defined as that condition of saturation of the core of transformer 12 which requires that the potential across the reset winding 17 be positive at the dot end of the reset winding 17 in order to maintain the core in its negative saturation condition. From an examination of FIGURE 1, it can be appreciated that the ampere turns of the primary winding 15 act in opposition to the ampere turns of the reset winding 17 with respect to their effect on the core of saturable core transformer 12. Hence, the ampere turns of primary winding 16 tend to drive the core of transformer 12 out of negative saturation into positive saturation.

In operation, if it is assumed that the reset winding 17 has driven the core of the saturable core transformer 12 into negative saturation, then upon the application of a turn-on signal $i_b$ to the turn-on gate 14 of SCS 11, conduction will take place through the SCS 11. Upon SCS 11 being turned on, a collector current $i_c$ will flow through the primary winding 15. This collector unsaturates the core of transformer 12, and induces a holding current $i_h$ in the secondary winding 16. This induced holding current $i_h$ will then hold the SCS 11 turned on. If it is assumed that the ampere turns of the primary winding 15 exceed the ampere turns of the reset winding 17, in effect the primary winding 15 can overcome the effect of the reset winding 17, and the SCS 11 will be held on by the holding current $i_h$ for the period of time required for the primary winding 15 to drive the core of the saturable core transformer 12 into positive saturation. As a result, the SCS 11 will remain on until the core of the saturable core transformer 12 reaches positive saturation.

Figure 3:
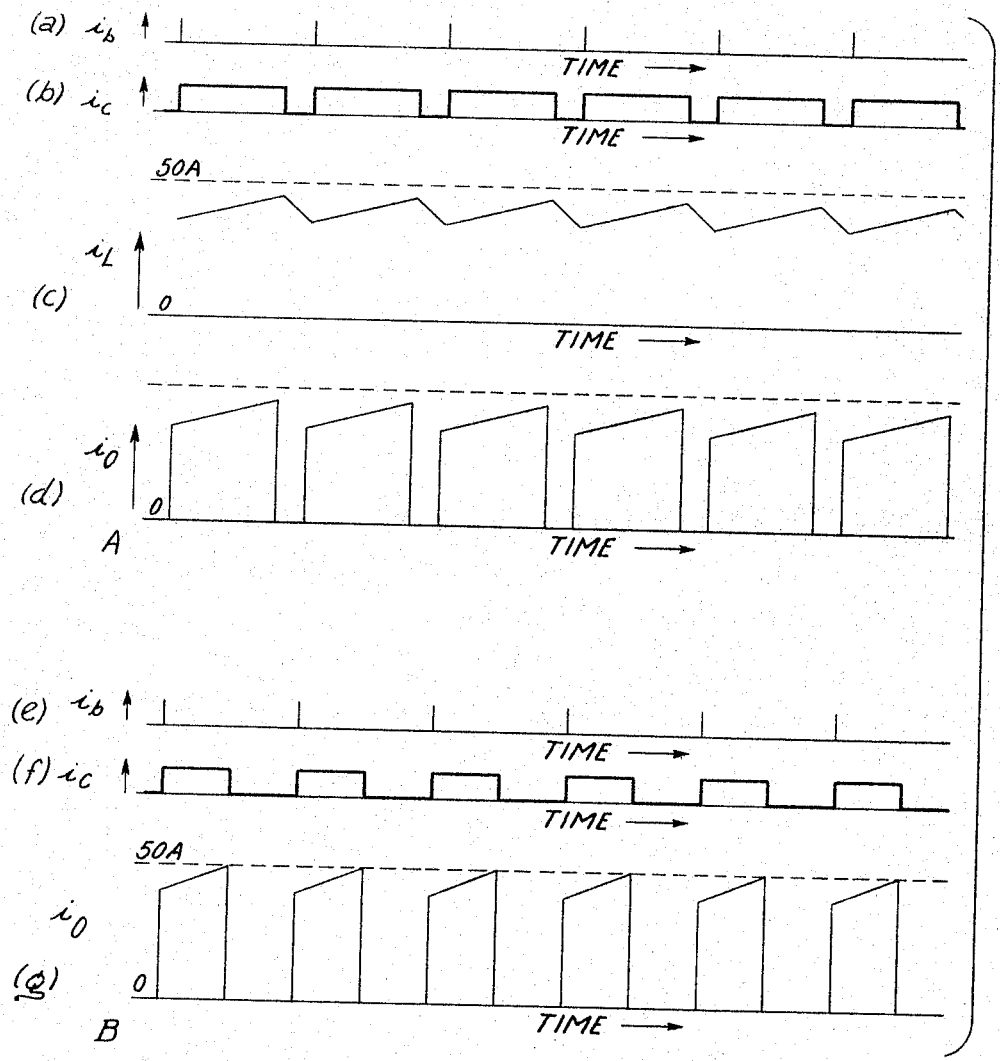
FIGURE 3 is a series of voltage and current versus time characteristic curves of the circuit shown in FIGURE 1.

Upon the core of the saturable core transformer 12 reaching positive saturation, the holding current $i_h$ will be reduced to zero due to the fact that the primary and secondary windings will be decoupled so that the SCS 11 will turn off and the collector current $i_c$ will decrease to zero. With the collector current $i_c$ equal to zero, the reset current $I_R$ can then take over and drive the flux of the core of saturable core transformer 12 back into negative saturation. After the core of saturable core transformer 12 reaches negative saturation, the succeeding pulse of turn-on current $i_b$ can then again turn on the SCS 11. The SCS 11 will then again remain on for the fixed period of time required for the core of saturable core transformer 12 to again be driven into positive saturation by secondary winding 16 thereby repeating the cycle of operation described above. In FIGURE 3 of the drawings, if it is assumed that the characteristic curve shown in FIGURE 3(a) illustrates the nature of the turn-on pulses $i_b$ applied to the turn-on gate 14 of SCS 11, then the collector current $i_c$ resulting from operation of the circuit in the above manner will have the wave shape shown in FIGURE 3(b). As shown in FIGURE 3(b), the collector current $i_c$ is essentially a square wave whose frequency is determined by the repetition rate of the turn-on signal $i_b$ and whose duration is determined by the parameters of the timing saturable core transformer 12.

Figure 2:
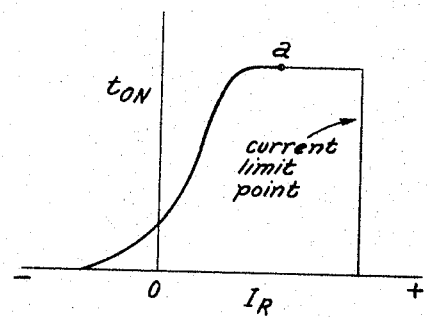
FIGURE 2 is a characteristic curve plotting the time on versus reset current characteristic of the circuit shown in FIGURE 1.

From a consideration of FIGURE 2 of the drawings, it can be appreciated that the time that the SCS 11 is conducting, that is the time on $(t_{on})$, can be varied by varying the value of the reset current $I_R$ through varying the value of the resistor 24, etc. If the value of the reset current $I_R$ is decreased from position $a$ in FIGURE 2 the time that SCS 11 is on $t_{on}$ is decreased. If $I_R$ is increased beyond position $a$ then at some predesigned value the SCS 11 will be suddenly turned off. This predesigned value is ascertained by the ampere turns $i_c N_p$ of the primary winding 15 of saturable core transformer 12 and the ampere turn $I_R N_r$ of the reset winding 17. If the ampere turn $I_R N_r$ of the reset winding 17 exceeds the ampere turns $i_c N_p$ of the primary winding 15, the holding current $i_h$ induced in a secondary winding 16 decreases to zero and the SCS 11 will turn off. With the SCS 11 turned off, the value of collector current $i_c$ will decrease to zero so that the saturable core transformer 12 will be reset to negative saturation by the reset current $I_R$ flowing in the reset winding 17. If a pulse of turn-on current $i_b$ in the nature of a one microamp pulse having a duration of .5 microsecond is then applied to the turn-on gate 14, the SCS 11 will turn on momentarily. Then, if the ampere turns of the reset winding 17 still equal or exceed the ampere turns of the primary winding 15, the SCS 11 will turn off immediately upon removal of the turn-on current $i_b$. However, if the ampere turns of the reset winding 17 have dropped to a value less than the ampere turns of the primary winding 15, the SCS 11 will remain on for the period of time $t_{on}$ as illustrated in FIGURE 3($b$) of the drawings, and as discussed above.

Figure 5:
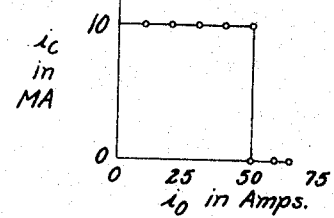
FIGURE 5 is a characteristic curve illustrating the collector current versus reset current operating characteristic of the circuit arrangement of FIGURE 4.
Figure 6:
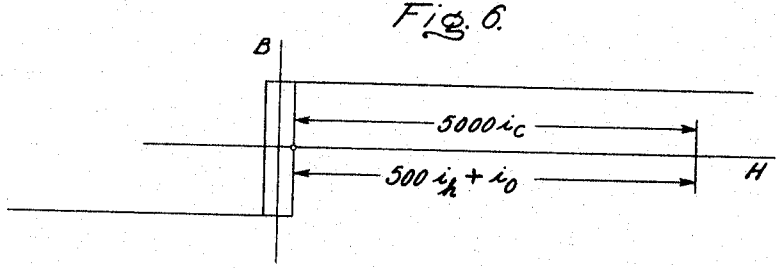
FIGURE 6 is a magnetic hysteresis curve illustrating the relationship between the values of the collector current, the holding current and the reset current of the circuit shown in FIGURES 1 and 4.

When the new and improved current limit circuit is used in a time ratio control power circuit, or in any other form of power circuit, the reset winding 17 of the circuit arrangement shown in FIGURE 1 is replaced by a single turn conductor 17 that is part of the power circuit passing through the toroidal core member 18 of saturable core transformer 12 as shown in FIGURE 4 of the drawings. In the particular arrangement shown in FIGURE 4 the current limit is designed to limit the load current $i_o$ flowing in the power conductor 17 to a value of 50 amperes. For a limited load current of this value, and an SCS 11 having the current and voltage characteristics cited above, the primary winding 15 of saturable core transformer 12 should have 5000 turns and the secondary winding 16 should have 500 turns. The operating characteristic of the circuit of FIGURE 4 is shown in FIGURE 5 wherein it can be seen that for a load current value $i_o$ of 50 amperes, the collector current $i_c$ will reduce from a value of 10 milliamperes to zero. The ampere turns relations of the primary, secondary and reset windings of saturable core transformer 12 are illustrated in FIGURE 6 of the drawings wherein it can be seen that the core of saturable core transformer 12 is driven out of negative saturation toward positive saturation by 5000 ampere turns flowing in the 5000 turn primary winding 15. Neglecting the width of the VH hysteresis loop, if the load current $i_o$ is equal to zero, then a holding current $i_h$ equals 100 milliamperes will be induced in secondary winding 16, and of course the SCS 11 will be held on for the period of time $t_{on}$ required to drive the core 12 into positive saturation as illustrated in FIGURE 3($b$). If the load current $i_o$ flowing in the load current conductor 17 is increased to a value of 49.9 amperes, then holding current $i_h$ will have a value of $5/10$ of a milliampere, and the SCS 11 will still remain on for the period of time $t_{on}$ required to drive the core of saturable core transformer 12 into positive saturation as illustrated in FIGURE 3($b$). However, if the value of the load current $i_o$ flowing in the load conductor 17 reaches a value of 50 amperes, then the value of the holding current $i_h$ will be reduced to zero, and the SCS 11 will turn off. This in turn will result in turning off the power circuit associated with the new and improved current limit circuit as will be explained more fully in connection with FIGURES 7–14 of the drawings. It can be appreciated therefore that the amplitude of the current limit is adjusted by adjusting the value of the collector current $i_c$ or the primary turns $N_p$ of the primary winding 15. The core of the saturable core transformer 12 is re-set by the load current $i_o$ flowing in the load current conductor 17 after the SCS 11 is turned off.

FIGURE 7 of the drawings illustrates a new and improved time ratio control power circuit which employs the new and improved current limiting protective circuit as a component part thereof. The new and improved time ratio control power circuit shown in FIGURE 7 includes a load current conductivity controlled conducting device 31 comprised by a silicon controlled rectifier (SCR) connected in series circuit relationship with a load 32 and a filter inductance 33 across a pair of power supply termnials 34 and 35. The supply terminals 34 and 35 in turn are adapted to be connected across a source of direct current electric potential having its positive terminal connected to the supply terminal 34 and its negative terminal connected to the supply terminal 35. If desired, the power supply terminal 35 may of course be grounded. A conventional coasting rectifier 36 is connected in parallel circuit relationship with the series connected load 32 and filter inductance 33.

Commutation circuit means comprised by a commutating capacitor 37 and a saturable core autotransformer 38 are connected in series circuit relationship across the load current carrying SCR 31. The saturable core autotransformer 38 has its primary winding portion 39 connected in series circuit relationship with the load 32, filter inductance 33 and load current carrying SCR 31 at a point intermediate the load current carrying SCR 31 and filter inductance 33. The secondary winding portion 41 of the saturable core autotransformer 38 of course has one terminal connected to the common tap point of autotransformer 38 with primary winding portion 39 and the remaining terminal connected through a blocking diode 42 to the commutating capacitor 37. The commutation circuit means of the circuit arrangement shown in FIGURE 7 is completed by an auxiliary conductivity controlled SCR conducting device 43 which comprises an auxiliary silicon controlled rectifier. The auxiliary SCR 43 has its collector electrode connected to the junction of the commutating capacitor 37 and blocking diode 42, and hence can be stated to be connected to the junction of the commutating capacitor 37 with the secondary winding portion 41. The emitter electrode of auxiliary SCR 43 is connected to the juncture of the load current carrying SCR 31 and the mid tap point of the saturable core autotransformer 38.

In addition to the above recited structure, the FIGURE 7 circuit arrangement includes a current limiting protective circuit portion comprised by a silicon control switch 11 and a saturable core transformer 12. The saturable core transformer 12 includes a primary winding 15 which is connected in series with the emitter-collector load terminals of SCS 11, and through two limiting resistors 22 and 45 and the primary winding 46 of a coupling transformer 47 to the power supply terminal 34. The secondary winding 48 of coupling transformer 47 is connected to the control gate of the auxiliary SCR 43 in the commutation circuit means associated with load current carrying SCR 31.

Primary winding 15 of the saturable core transformer 12 is inductively coupled to secondary winding 16 that is connected to the hold-on gate of SCS 11. Both primary winding 15 and secondary winding 16 of the saturable core transformer 12 are wound in common on a toroidal core member with a reset winding 17 fabricated in the manner shown in FIGURE 4 of the drawings. Accordingly, it can be appreciated that the reset winding 17 constitutes nothing more than a single turn conductor included in the load current carrying circuit comprised by load current carrying SCR 31, load 32, filter inductance 33 and the primary winding portion 39 of the saturable core autotransformer 38. By this arrangement, load current flowing through the single turn conductor 17 will control the operation of the current limiting circuit comprised by SCS 11 and saturable core transformer 12 in the manner previously described in connection with FIGURES 1 and 4 of the drawings. In addition to the above connections, it should be noted that a gating signal source is connected in common to the control gates of load current carrying SCR 31, and to the turn-on gate of the SCS 11, so that gating signal pulses are applied to the respective turn-on gates of SCS 11 and SCR 31 simultaneously.

The principle of controlling the value of a direct current potential by time ratio control has previously been published in detail. For example, see the article entitled, "A New Control Amplifier Using a Saturable Current Transformer and a Switching Transistor," by R. E. Morgan, AIEE Transactions, vol. 77, part 1, pages 557–562 or "A New Magnetic Control Rectifier Power Amplifier With a Saturable Reactor Controlling On Time," AIEE Transactions, vol. 80, part 1, pages 150–155. In view of the above, a detailed description of the time ratio control of direct current electric power is believed unnecessary. Briefly, however, it can be stated that by turning the load current carrying SC R31 on and off at predetermined intervals, the amount of direct current power supplied to the load 32 can be varied proportionally. In order to do this, SCR 31 and the SCS 11 are turned on simultaneously. Upon the load current carrying SCR 31 being turned on, load current $i_L$ or $i_o$ will be supplied to the load 32, and will flow through the reset winding conductor 17 so as to influence the operation of the current limit as described previously in connection with FIGURES 1 and 4.

If it is assumed initially that the load current $i_o$ flowing in the conductor 17 is within the prescribed limits, then the period of time that the SCS 11 continues to conduct, that it its time on ($t_{on}$), will be determined by the period of time required for the core of the saturable core transformer 12 to be driven into positive saturation by the collector current $i_c$ flowing in primary winding 15. Upon the core of the saturable core transformer 12 reaching positive saturation, the SCS 11 will be turned off as previously described with relation to FIGURES 1 and 4, and will result in the production of a current pulse in the coupling transformer 47. This current pulse which is positive at the dot end of the secondary winding 48 of coupling transformer 47 turns on the auxiliary SCR 43 and thereby initiates commutation of the load current carrying SCR 31.

The operation of the commutation circuit means comprised by a commutating capacitor 37 and the saturable core autotransformer 38 has been described in detail previously in U.S. Patent No. 3,019,355, R. E. Morgan inventor, entitled, "Magnetic Silicon Controlled Rectifier Power Amplifier," issued Jan. 30, 1962, and for a detailed discussion of the manner of operation of the commutation circuit means, reference is made to this patent. Briefly, however, the circuit functions as follows. During the quiescent intervals while the load current carrying SCR 31 is nonconducting, the commutating capacitor 37 will be charged to essentially the full potential of the direct current power supply with a polarity which is negative at the dot side of the capacitor. This is achieved at the end of the previous interval of operation where load current $I_L$ flowing through the coasting rectifier 36 and part of the primary winding portion 39 of the saturable core autotransformer 38 charges commutating capacitor 37 negatively at the dot side, and resets the core of saturable core autotransformer 38. Upon the load curent carrying SCR 31 being turned on, load curent flows through the primary winding portion 39 of the saturable core autotransformer 38. Load current flow through the primary winding portion 39 induces current flow in the secondary winding portion 41 and through the blocking diode 42 and discharges the commutating capacitor 37 with most of the energy of the commutating capacitor being transferred to the load 32 through the autotransformer 38. This charging action of the commutating capacitor 37 continues with continued conduction of SCR 31 so that the commutating capacitor 37 is charged positively at the dot side to a value determined by the value of the load current. Charging of the commutating capacitor 37 terminates upon the saturable core autotransformer 38 reaching saturation. After the saturable core autotransformer 38 saturates, the commutating capacitor 37 remains charged positively at the dot side until such time that the auxiliary SCR 43 is turned on.

Upon the auxiliary SCR 43 being turned on, the emitter-electrode of the load current carrying SCR 31 will be driven positive at point $b$ with respect to the point $a$ thereby reversing the voltage across the load current carrying SCR 31 and causing the SCR 31 to be turned off. Upon SCR 31 and causing the SCR 31 to be turned off. Upon the load current carrying SCR 31 being turned off, load current will be circulated through the coasting rectifier 36 in the conventional fashion to again recharge the commutating capacitor 37 negatively at the dot thereby causing the auxiliary SCR 43 to be turned off by the reversal of the polarity of the potential across this device. This then completes one cycle of operation of the time ratio control power circuit.

From the foregoing description, it can be appreciated that at the time that the SCS 11 is turned off by reason of the saturable core transformer 12 being driven into positive saturation thereby resulting in the production of a turn-on pulse in the coupling transformer 47, that this action controls the turn-on of the auxiliary SCR 43, and hence initiates commutation of the load current carrying SCR 31. The time for the saturable core autotransformer 38 to charge the commutating capacitor 37 positive at its dot side is relatively short (about 50 microseconds) compared to the time-on ($t_{on}$ equal to about 1000 microseconds or more) of the SCS 11. With the commutating capacitor 37 charged positively at the dot side, the load current carrying SCR 31 can be turned off the instant that the SCS 11 is turned off as is illustrated by a comparison of FIGURE 3($b$) and FIGURE 3($d$) of the drawings. The resulting load current $I_L$ supplied to load 32 is illustrated in FIGURE 3($c$) of the drawings. It should also be noted that overcurrent will not normally occur before the commutating capacitor 37 can be charged positively at its dot side due to the time required for the current $i_o$ flowing through the reset winding 17 to increase through the filter inductance 33.

It should be remembered that the above description pertains where there is no overcurrent flowing through the single turn conductor 17. In the event of an overcurrent, the current limiting circuit comprised by SCS 11 and saturable core transformer 12 detects the overcurrent in the manner described with relation to FIGS. 1 and 4 of the drawings to cause the SCS 11 to be turned off. Upon the SCS 11 being turned off by an overcurrent flowing in the single turn conductor 17, the auxiliary commutating control rectifier 43 is turned on by a gating signal pulse developed in the coupling transformer secondary winding 48 to thereby initiate early commutation of the load current carrying SCR 31. This mode of operation is illustrated in FIGURES 3($e$), 3($f$) and 3($g$) of the drawings. In FIGURE 3($f$) it can be seen that the time on ($t_{on}$) of collector curent $i_c$ flowing through SCS 11 is shortened with respect to the collector current $i_c$ shown in FIGURE 3($b$) where there is no overcurrent condition. The resulting effect on the load current $i_o$ flowing through the single turn conductor 17 is illustrated in FIGURE 3($g$) even though the gating signal pulses $i_b$ shown in FIGURE 3($e$) do not differ from those shown in FIGURE 3($a$).

From the above description, it can be appreciated that once the load current carrying SCR 31 is turned on, it stays on for a fixed length of time $t_{on}$, provided that overcurrent does not occur. The frequency of the gating signal source connected to the control gates of the load current carrying SCR 31 and SCS 11 can be controlled to thereby control the value of the load voltage. This controllable frequency type of control is illustrated because of its simplicity although it should be understood that the current limit can be made to operate on other types of time ratio control circuits such as a fixed frequency with controllable on time. The length of time $t_{on}$ that the load current carrying SCR 31 is turned on therefore, is determined primarily by the timing of the saturable core transformer 12 of the current limiting circuit. This time $t_{on}$ is the length of time required to drive the flux in the core of the saturable core transformer 12 from negative to positive saturation. In the event overcurrent in the conductor 17 occurs before the saturable core transformer 12 normally saturates, the SCS 11 is turned off instantly, and results in instantaneously turning off the load current carrying SCR 31 as discussed above. From this description, therefore, it can be appreciated that the invention makes available a fast acting current limiting protective for the time ratio control circuit which by reason of its manner of fabrication as shown in FIGURE 4 of the drawings effectively isolates the power circuits from the operation of the current limiting protective circuit. This isolation of the power circuit from the protective circuit is a significant feature in many circuit applications. In addition to providing insulation between the power circuit and the current limiting protective circuit, it should be noted that the particular arrangement for sensing overcurrent constitutes absolutely no power drain on the power circuit thereby greatly improving the efficiency of the overall current limited time ratio control power circuit. Since the current limiting feature requires only few additional parts, the overall arrangement is compact and economical to manufacture, and makes available a highly desirable current limited time ratio control power circuit.

In FIGURE 7 of the drawings, it should be noted that a feedback diode 49 is connected in parallel circuit relationship with the load current carrying SCR 31 in a reverse polarity sense. The feedback diode 49 is an alternative connection that may be included in the circuit arrangement of FIGURE 7 as determined by the nature of the load 32 and for this reason is shown in dotted outline form. If the load 32 is highly inductive, it may be necessary to feed back current to the power supply through the feedback diode 49. Since the nature and operation of feedback diode 49 has previously been described in detail, a further description of its manner of operation is believed unnecessary. See, for example, the paper entitled "A Silicon Controlled Rectifier Inverter With Improved Commutation" by W. McMurray and D. P. Shattuck, AIEE Transactions Paper, vol. 80, part 1, pages 531–542.

FIGURE 7a of the drawings illustrates another modified form of the circuit arrangement of FIGURE 7. If the dash-dot box shown in FIGURE 7a were inserted in place of the dash-dot box in the circuit arrangement of FIGURE 7 with the points a and b connected to the corresponding points a and b of the FIGURE 7 circuit, a triac version of the new and improved time ratio control power circuit would result. The triac is a solid state five layer semiconductor gate controlled bidirectional conducting device recently made available to the industry by the Rectifier Components Department of the General Electric Company located in Auburn, New York. For a detailed description of the triac device, reference is made to Application Note 200.35 entitled, "Triac Control for A.-C. Power," by E. K. Howell, published by the Rectifier Components Department of the General Electric Company located in Auburn, New York. The triac 50 of FIGURE 7a has its control gate connected to a source of gating pulses, and to an additional gating signal means comprised by a diode 51 and resistor 52 connected in series circuit relationship between the load terminal a and the control gate of the triac. This arrangement can be substituted for the load current carrying SCR 31 and associated feedback diode 49 of FIGURE 7. By such an arrangement, the gating signal source connected to the control gate of the triac 50 will turn the triac on in the load current carrying direction, and the diode 51 and limiting resistor 52 will serve to turn on the triac in the reverse feedback direction upon the polarity of the potentials across the load terminals a and b being reversed. In all other respects, the circuit arrangement incorporating the changes shown in FIGURE 7a will function in an identical manner to that described with relation to FIGURE 7, and hence will not be again described in detail.

FIGURE 8 of the drawings illustrates a form of time ratio control power circuit which includes a power diac 61 connected in series circuit relationship with a load 32 and filter inductance 33 across a pair of power supply terminals 34 and 35. Power diac 61 is a five layer shorted emitter controlled bidirectional conducting semiconductor device which has been described in detail in an article entitled "Two-Terminal Asymmetrical and Symmetrical Silicon Negative Resistance Switches" by R. W. Aldrich and N. Holonyak, Jr. appearing in the "Journal of Applied Physics," vol. 30, No. 11, November 1959, pages 1819–1924. The diac similar to the triac is a bidirectional conducting device. Like both the SCR and the triac, the diac is a device which once conduction has been initiated through the device, application of a commutating reverse potential across the load terminals of the device is required in order to stop conduction through the device. Unlike the SCR or the triac, however, the diac is not a gate turn-on device but requires the application of a sharp voltage rise across the load terminals of the device in order to turn it on.

In order to turn on the diac 61 of FIGURE 8, firing circuit means are provided which are comprised by a first firing capacitor 62, a snap switch device 63 and a second firing capacitor 64 connected in series circuit relationship across the diac 61. The snap switch device 63 may comprise a Shockley diode, a Hunt diode, or a signal diac manufactured and sold by the Rectifier Components Department of the General Electric Company, Auburn, New York. All of these snap switch devices are of such a nature that when the potential across the device reaches a predetermined firing level the device instantaneously is rendered conductive, and upon the potential across the device returning below the predetermined firing level, the device automatically becomes blocking.

The juncture of the current switch device 63 and firing capacitor 64 is connected through a limiting resistor 65 to the power supply terminal 34 and hence to load terminal a of diac 61, and the juncture of the snap switch device 63 and the firing capacitor 62 is connected through a limiting resistor 66 and blocking diode 67 to the remaining load terminal b of diac 61. Connected in parallel circuit relationship with the firing capacitor 62 is a firing control circuit comprised by an NPN junction transistor 68 and series connected limiting resistor 69. A control potential supplied to the base of transistor 68 controls the rate of charging of the capacitor 62, and hence the point at where the snap switch 63 will be rendered conductive. Upon snap switch 63 being rendered conductive, the potential across the two capacitors 62 and 64 (which upon 63 being turned on are then effectively connected in series) will drive the potential of the load terminal b sharply negative with respect to load terminal a thereby causing the diac 61 to be turned on and to conduct current in the load current direction. The control potential which controls the turn on of the power diac 61 is also applied to the turn-on gate of the SCS switch 11 included in the current limiting circuit as will be described more fully hereinafter.

Also included in circuit relationship with the power diac 61 is commutation circuit means comprised by commutating capacitor 37, saturable autotransformer 38 and auxiliary commutating SCR 43. Since each of these elements has been described in connection with the circuit arrangement of FIGURE 7, and since they cooperate in precisely the same manner in the circuit of FIGURE 8 as they do in the circuit arrangement of FIGURE 7, a further description of the nature of commutation operation of these elements, is believed unnecessary. Similarly, the current limit comprised by the SCS 11 and saturable core transformer 12 is arranged in precisely the same manner and functions in identical function to the current limit described with relation to the FIGURE 7 circuit arrangement, and hence will not be again described in detail.

Upon placing the circuit of FIGURE 8 in operation, a gating-on signal applied to the turn-on gate of the SCS 11 and to the NPN transistor 68 causes the SCS 11 and the power diac 61 to be turned on simultaneously. Thereafter assuming that there is no overcurrent, the current limit circuit comprised by SCS 11 and saturable core transformer 12 will operate after a period $t_{on}$ to turn on the auxiliary commutating SCR 43 and thereby commutate off the power diac 61 in successive cycles of operation in precisely the same manner as the circuit arrangement of FIGURE 7. In the event of an overcurrent condition, an overcurrent flowing in the single turn conductor reset winding 17 will cause the current limiting circuit to turn off the power diac 61 at the instant the overcurrent occus in precisely the same fashion described in relation to the FIGURE 7 arrangement. The circuit arrangement shown in FIGURE 8 therefore has all of the advantages of the arrangement shown in FIGURE 7. In addition, however, because of the nature of the power diac 61 which is an avalanche operated device, the circuit of FIGURE 8 is capable of operating at higher frequencies than is the circuit arrangement of FIGURE 7.

Under certain conditions of operation where the load 32 is highly reactive in nature, it will be desirable to feed back current to the power source through the power diac 61. In order to do this it will be necessary to take advantage of the bidirectional conducting characteristics of the diac 61. For this purpose, a reverse feedback current firing circuit means is provided which includes the additional pulsing capacitors 62', 64' and the snap switch device 63' together with their associated resistors 65', 66' and blocking diode 67'. This additional pulsing means will serve to turn on the power diac 61 in the reverse feedback current direction whenever the potential of the point $b$ goes positive with respect to the point $a$. Upon this occurrence, the blocking diode 67' will couple the rise in potential of point $a$ to the snap switch device 63' to cause it to turn on the firing circuit. By this arrangement, where the load 32 is highly reactive, when it is necessary to feed back current to the direct current power supply as the point $b$ goes positive with respect to point $a$, the power diac 61 is turned on to conduct current in the reverse feedback current direction.

In order not to interfere with the commutation operation of the commutation circuit means comprised by commutating capacitor 37, saturable autotransformer 38 and the auxiliary commutating SCR 43, it is necessary to provide a blocking circuit means to the reverse feedback current firing circuit during the commutation operation when the dot side of the commutating capacitor 37 is driven positive. For this purpose, an NPN junction transistor 71 is provided which is connected in parallel circuit relationship with the pulsing capacitor 62'. The transistor 71 has its base electrode connected to a pair of voltage dividing resistors 72 and 73 which are connected in parallel circuit relationship across the commutating capacitor 37. By this arrangement, when the dot side of the commutating capacitor 37 goes positive with respect to the supply terminal 34, the NPN junction transistor 71 will be turned full on so as to short circuit the pulsing capacitor 62' and prevent it from firing the diac 61 during the commutation interval. By this means, it is assured that commutation off of the power diac 61 in the load current direction will occur without interference from the reverse current feedback firing circuit. It can be appreciated therefore that the inclusion of a power diac 61 in the circuit arrangement of FIGURE 8 increases the versatility of the circuit in that the single power diac device 61 can be used to supply current both in the load current direction and in the feedback current direction as a result of its bidirectional conducting capability.

FIGURE 8a of the drawings illustrates an alternative form of the circuit arrangement shown in FIGURE 8. In FIGURE 8a a $dv/dt$ fired silicon controlled rectifier device 75 having its gate open-circuited, and having a feedback diode 49 connected in parallel circuit relationship therewith in a reverse polarity sense, is substituted in place of the power diac 61 in the circuit arrangement of FIGURE 8. With the circuit thus modified, it would *not* be necessary to include the reverse current feedback firing circuit means 62' through 67' and the associated blocking circuit means 71 through 73 since the need for such firing and associated blocking circuit means is obviated by the use of the feedback diode 49. In all other respects, the circuit modification of FIGURE 8a would be identical in construction and operation to the circuit arrangement of FIGURE 8, and would provide substantially the same advantages with respect to the higher frequency of operation made possible by the avalanche operation of the $dv/dt$ fired silicon controlled rectifier device 75.

Figure 9:
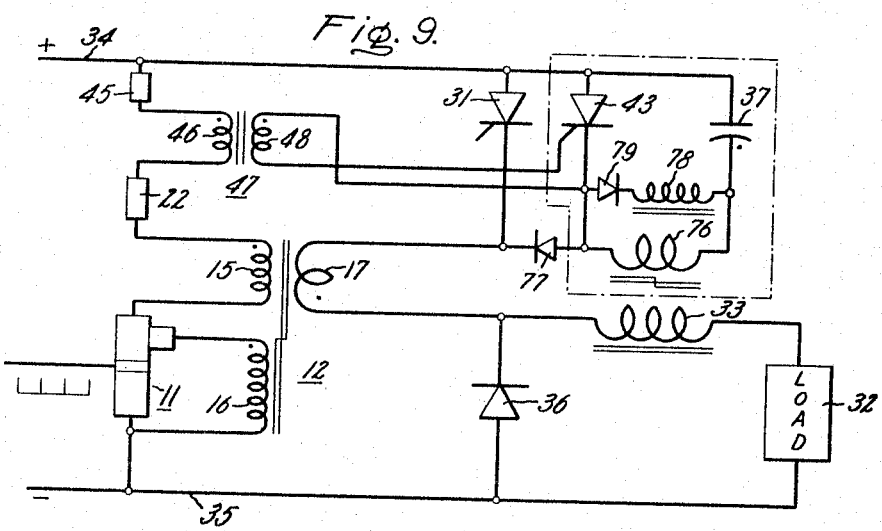
FIGURE 9 is a detailed schematic circuit diagram of a still another form of new and improved time ratio control power circuit employing a novel current limit protective circuit constructed in accordance with the present invention.

FIGURE 9 of the drawings illustrates still a different form of time ratio control circuit employing the new and improved current limit protective circuit as a part thereof. The circuit arrangement shown in FIGURE 9 uses a different commutation circuit means from that used in the circuits shown in FIGURES 7 and 8 of the drawings. However, in the circuit arrangement of FIGURE 9, elements which correspond to like elements of the circuit arrangement shown in FIGURES 7 and 8 have been given the same reference numeral as their corresponding elements, and hence are not described in detail again. The FIGURE 9 circuit arrangement employs a load current carrying SCR 31 which is commutated off by a commutating circuit means comprised by a commutating capacitor 37 and a saturable reactor winding 76 connected in series circuit relationship with a blocking diode 77 across the load carrying silicon controlled rectifier 31. A linear inductance 78 and series connected blocking diode 79 are connected in parallel circuit relationship with the saturable reactor winding 76 with the linear inductance 78 being designed to have the same value as the saturated inductance of the saturable reactor winding 76. This inductance is designed to series resonate with the commutating capacitor 37 at a desired commutating frequency. An auxiliary commutating SCR 43 is connected between the power supply terminal 34 (and hence one load terminal of the load current carrying SCR 31) and the juncture of the saturable reactor winding 76 with the series connected diode 79 and linear inductance 78. The control gate of the auxiliary commutating SCR 43 is of course connected to the secondary winding 48 of coupling transformer 47.

For a more detailed description of the construction and operation of the commutation circuit shown in FIGURE 9 of the drawings, reference is made to IEEE Paper No. 63–1448, dated Oct. 27, 1963 by R. E. Morgan entitled "Time Ratio Control With Combined SCR and SR Commutation." Briefly, however, it can be stated that the commutation circuit means operates in the following manner. The commutating capacitor 37 is charged to essentially the full potential direct current power supply during the quiescent portions of the operating cycles of the circuit through the blocking diode 72 and the saturable reactor 76. This charging current serves to drive the saturable reactor 76 into its negative saturation so that the potential across it must be positive at the no dot side of the commutating capacitor 37 in order to retain saturable reactor 76 in its saturated condition.

With the circuit thus conditioned, upon the auxiliary commutating SCR 43 being turned on, the charge on the commutating capacitor 37 is oscillated 180° through the closed series circuit loop comprised by linear inductance 78, diode 79 and auxiliary commutating SCR 43 to reverse the polarity of the charge on commutating capacitor 37. Thereafter the saturable reactor 76 will be driven out of negative saturation toward positive saturation due to the reversed polarity of the charge on the commutating capacitor 37, and diode 79 blocks further conduction through the linear inductance 78. During the period of time that the saturable reactor 76 is being driven from one condition of saturation into the other the load current carrying SCR 31 will continue to conduct. However, upon the saturable reactor 76 reaching its positive condition of saturation, the emitter electrode of load SCR 31 will be driven positive with respect to its collector thereby causing SCR 31 to be turned off. Turn off of the auxilary commutating SCR 43 will also occur due to the reversal of the polarity of the potentials across this device. Upon the two SCR's 31 and 43 being turned off, saturable reactor 76 will again be driven back into its initial condition of negative saturation by the charging current to the commutating capacitor 37 to thereby condition the circuit for a new cycle of operation.

From the above description it can be appreciated that commutation of the load current carrying SCR 31 is initiated by turning on the auxiliary commutating SCR 43. Turn on of the auxiliary commutating SCR 43 is determined by the current limiting circuit comprised by the SCS 11 and the saturable core transformer 12 which operates in precisely the same manner as was described with relation to the circuit arrangement shown in FIGURE 7 of the drawings. Accordingly, it can be appreciated that the time ratio control circuit shown in FIGURE 9 will operate in precisely the same manner as the circuit arrangement of FIGURE 7 with the exception of the manner of the commutation of the load current carrying SCR 31. In the event of an overcurrent through load SCR 31, the current limiting protective circuit comprised by SCS 11 and saturable core transformer 12 will function to commutate off the load current carrying SCR 31 in the same manner as that described with relation to FIGURE 7.

Figure 10:
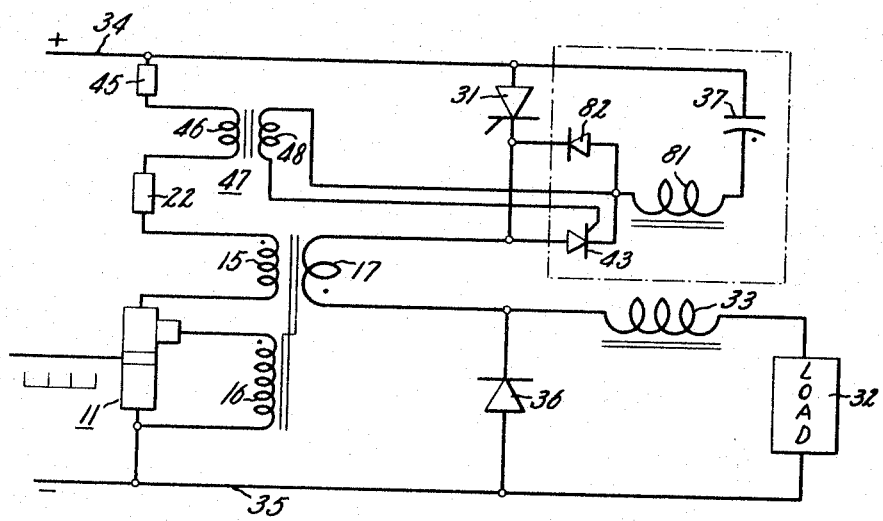
FIGURE 10 is a detailed schematic circuit diagram of still another form of new and improved time ratio control power circuit employing the novel current limit protective circuit of the present invention.

FIGURE 10 of the drawings shows still a different form of time ratio control power circuit constructed in accordance with the invention wherein still a different form of commutation circuit is employed to commutate off the load current carrying SCR 31. In the circuit arrangement of FIGURE 10, commutation circuit means are comprised by a commutating capacitor 37 connected in series circuit relationship with a linear inductance 81 which has a value such that the commutating capacitor 37 and inductance 81 are series resonant at the desired commutating frequency for the circuit. The terminal of the linear inductance 81 opposite that which is connected to the commutating capacitor 37 is connected through the auxiliary commutating SCR 43 to the emitter electrode of the load current carrying SCR 31 with a blocking diode 82 being connected in parallel circuit relationship with the auxiliary commutating SCR 43 in a reverse polarity sense. The control gate of the auxiliary commutating SCR 43 is of course connected to the secondary winding 48 of coupling transformer 47 for applying a turn-on gating signal to the auxiliary commutating SCR 43.

In operation the time ratio control circuit of FIGURE 10 will function in precisely the same manner as the time ratio control circuit shown in FIGURE 7 of the drawings with the exception that the commutation circuit means operates in a differential manner. In the FIGURE 10 circuit arrangement, the commutating capacitor 37 is first charged to the potential of the direct current power supply with the dot side of the capacitor having negative polarity. Commutation of SCR 31 is initiated by the current limit circuit comprised by SCS 11 and saturable core transformer 12 being turned off thereby turning on the auxiliary commutating SCR 43. When auxiliary SCR 43 is turned on the charge on the commutating capacitor 37 is oscillated 180° through the series resonant circuit comprised by linear inductance 81 and auxiliary commutating SCR 43 to reverse the polarity of the charge on the commutating capacitor 37. Upon this occurrence, the auxiliary commutating SCR 43 is turned off due to the reversal of the polarity across its load terminals, and the blocking diode 82 is rendered conductive. This results in applying a positive potential to the emitter electrode of the load current carrying SCR 31 which drives the emitter positive with respect to the collector electrode connected to the power supply terminal 34 and turns off SCR 31. Upon SCR 31 being turned off, the commutating capacitor 37 is again recharged through the diode 82 to thereby condition the circuit for a new cycle of operation. Accordingly, it can be appreciated that with the exception of the commutation operation, the circuit arrangement of FIGURE 10 functions in the manner described with relation to the FIGURE 7 circuit arrangement to achieve time ratio control and current limit of the direct current power being supplied across the load 32.

FIGURE 11 of the drawings illustrates a power inverter circuit which incorporates the new and improved current limit protective circuit as a part thereof. In the inverter circuit of FIGURE 11, there are two sets of two series connected silicon controlled rectifier devices 31a and 31c, and 31b and 31d, respectively, which are connected in series circuit relationship across a pair of power supply terminals 34 and 35. The junctures 86 and 87 of each of the sets of series connected SCR's 31a, 31c are interconnected through a load 85. By this arrangement, upon proper gating on of the respective SCR's 31a through 31d, an alternating current potential is developed across the load 85. To be particular, the gating signal source connected to the load current carrying silicon controlled rectifiers 31a through 31d is adjusted so that the two SCR's 31a and 31d are turned on simultaneously. This results in effectively connecting load terminal 86 to the supply terminal 34 and the terminal 87 of load 85 is connected to the supply terminal 35. Thereafter, the two load current carrying SCR's 31a and 31d are commutated off by their respective associated commutation and current limit protective circuit, and the two load current carrying SCR's 31b and 31c are turned on. This results in effectively connecting the terminal 87 of load 85 to power supply terminal 34, and the terminal 86 to the power supply terminal 35. Subsequently, the two load current carrying SCR's 31b and 31c are commutated off and a new cycle of operation initiated. It can be appreciated that through succeeding cycles of operation, an alternating current potential will be developed across the load 85.

From a comparison of the circuit of FIGURE 11 to the circuit shown in FIGURE 10 of the drawings, it can be appreciated that the commutation circuit means and the current limit protective circuit arrangement associated with each one of the respective load current carrying SCR's 31a through 31d are identical in construction and operation to the circuit arrangement shown in FIGURE 10 of the drawings. For this reason, it is not believed necessary to go into a detailed description of the construction and operation of the respective commutation and current limit protective circuit means associated with each of the load current carrying silicon controlled rectifier devices 31a through 31d. The circuit of FIGURE 11 is included in the present description, however, in order to illustrate the versatility of application of the new and improved current limit protective circuit made possible by the invention.

FIGURE 12 of the drawings illustrates the application of the new and improved current limit circuit to a three phase time ratio control circuit wherein the current limit circuit is used to balance the current of the three phases supplying a common load element 91. Since each of the individual single phase elements comprised by the load current carrying silicon controlled rectifiers 31, 31', 31" is identical in construction and operation to the single phase time ratio control circuit shown and described with relation to FIGURE 7 of the drawings, a further description of the individual circuits is believed unnecessary. It should be noted that each of the individual single phase time ratio control circuits does supply a common load element 91 and proper balance of the operation of the individual single phase time ratio control circuits is achieved through a common control winding 92, 92' and 92" which is inductively coupled in common with the overcurrent sensing conductors 17, 17' and 17" to the individual saturable core transformers 12, 12' and 12", respectively, of the current limit protective circuits associated with each of the individual single phase time ratio control circuits. Proper sequencing of the time of operation of the individual single phase time ratio control circuits is assured by proper relating the timing of the turn-on gating signal pulses applied to the turn-on gates of the SCS 11's and to the gates of the load current carrying silicon controlled rectifiers 31 to each of the individual single phase time ratio control circuits. By the inclusion of the current limit protective circuits in each of the single phase time ratio control circuits it is assured that each circuit will provide its share to the load 91 without producing any overcurrent in any of the individual phases. By the provision of the common control windings 92, 92' and 92", the point at which the saturable core transformers 12, 12' and 12" saturate, and hence the time on, of the individual single phase time ratio control circuit can be regulated to provide any desired proportionally controlled output voltage to the common load element 91.

FIGURE 13 of the drawings illustrates a transistor time ratio control circuit which employs the new and improved current limit protective circuit as an element thereof. This transistor time ratio control circuit operates with an SCS current limit protective circuit constructed in accordance with the invention to provide a proportionally controlled output voltage from the time ratio control circuit. This control is achieved as a function of a control signal used to vary the charging time of an RC type of control circuit. The transistor time ratio control circuit includes a power transistor 101 which is connected in series circuit relationship with a load 32, a filter inductance 33 and the primary winding 102 of a saturable core transformer 103 across the power supply terminals 34 and 35. The saturable core transformer 103 has a secondary winding 104 which is inductively coupled to the primary winding 102 with the primary winding 102 being effectively connected in the emitter-collector circuit of the power transistor 101, and the secondary winding 104 being connected in the emitter-base circuit of transistor 101. If desired, a battery or other source of starting current may be connected across the terminals 105, 106 to initiate operation of the saturable core transformer-transistor circuit.

For a more detailed description of the saturable core transformer-transistor circuit, reference is made to U.S. Patent No. 3,102,206, entitled, "Saturable Current Transformer-Transistor Circuit," by R. E. Morgan, issued Aug. 27, 1963, and assigned to the General Electric Company. Briefly, however, it can be stated that the power transistor 101 is initially turned on by a starting current supplied across the terminals 105, 106 to cause an emitter-base current to flow. This results in turning on the transistor 101 so that a collector current flows in the emitter-collector circuit. This emitter-collector current is transformed by the primary winding 102 into the secondary winding 104 to cause the transistor 101 to be turned full on. The transistor 101 will then be maintained in a fully turned on condition until such time that the saturable core of the saturable core transformer 103 saturates in which event the two windings 102, 104 will be decoupled and the transistor 101 turned off.

In addition to the above arrangement, the power transistor 101 is connected in series circuit relationship with a single turn conductor 17 that is inductively coupled to a saturable core transformer 12 in a current limit circuit 107 which is identical in construction and operation to the current limiting circuit described in FIGURES 1 and 4 of the drawings. For this reason, the component parts of the current limit protective circuit 107 comprised by saturable core transformer 12 and SCS 11 have been given the same reference numerals as the corresponding parts of the circuit arrangement described in connection with FIGURES 1 and 4.

In addition to the current limit protective circuit 107, a gating signal source 108 is provided which is comprised by a PNP junction transistor 109 connected in series circuit relationship with a resistor 111 and capacitor 112 across a direct current power supply. A control signal for controlling operation of the time ratio control circuit is supplied to the base electrode of the PNP junction transistor 109. By this arrangement, conduction through the PNP junction transistor 109 controls the rate of charge of the capacitor 112. The potential across capacitor 112 is coupled through the coupling diode 113 and resistor 114 to the turn-on gate of the SCS 11 in the current limit protective circuit 107 to control turn on of SCS 11.

The SCS 11 in the current limit protective circuit 107 is effectively coupled through a coupling capacitor 115 to the turn-on gate 116 of a second silicon controlled switch device 117. The second silicon control switch device 117 has one of its load terminals connected through a limiting resistor 118 and feedback winding 119 wound on the core of the saturable core transformer 103 to the power supply terminal 34. The feedback winding 119 is inductively coupled to an inhibit winding 121 which likewise is wound on the core of the saturable core transformer 103 and is inductively coupled to the secondary winding 104 as well as the primary winding 102 and feedback winding 119. Inhibit winding 121 has an intermediate point grounded, with one portion of the winding being coupled through a coupling diode 122 to the hold-on terminal 123 of the SCS 117 while the remaining terminal of inhibit winding 121 is coupled through a second coupling diode 124 back to the hold-on terminal 123 of SCS 117 in common with the first mentioned winding portion connected through diode 122. In order to isolate operation of the current limit circuit and the inhibit circuit from the gating signal source, a blocking capacitor 125 is provided along with a blocking diode 126 and limiting resistor 127.

For a more detailed description of the manner of operation of the transistor-saturable core transformer time ratio control circuit including power transistor 101, reference is made to the above-identified U.S. Patent No. 3,102,206. It is believed sufficient for the present description, however, to point out that the transistor 101 is alternately turned on and off by saturable core transformer 103 and the associated inhibit circuit comprised by SCS 117 and inhibit winding 121. With such a circuit arrangement, the inhibit winding 121 performs the timing function to control turn off of transistor 101 whether there is an overcurrent flowing in the single turn conductor 17 or not. If there is no overcurrent in conductor 17, the control signal applied to transistor 109 controls turn on of SCS 11 which is then turned off by saturation of the core of 12 in the normal manner described with relation to FIGURES 1 and 4. In the event of an overcurrent, the SCS 11 in the overcurrent limit protective circuit 107 will be turned off as described previously in connection with FIGURES 1 and 4 of the drawings. Upon the SCS 11 being turned off by either means mentioned above, a positive turn-on pulse is supplied through the coupling capacitor 115 to the turn-on gate 116 of the SCS 117. Upon SCS 117 being turned on, a collector current will flow through the feed-back winding 119 which is inductively coupled to the winding 121. This induces a hold current in the winding 121 which then serves to hold the SCS 117 on. Upon the SCS 117 being maintained on, a closed current path is provided for the inhibit winding 121 which will load the primary winding 102 of saturable core transformer 103 to such a degree that adequate base current can no longer be supplied to the base of the power transistor 101 thereby causing the power transistor 101 to be turned off instantaneously. In this manner, turn-off control and current limiting protection is provided for the transistor-saturable core transformer time ratio control circuit.

Figure 14:
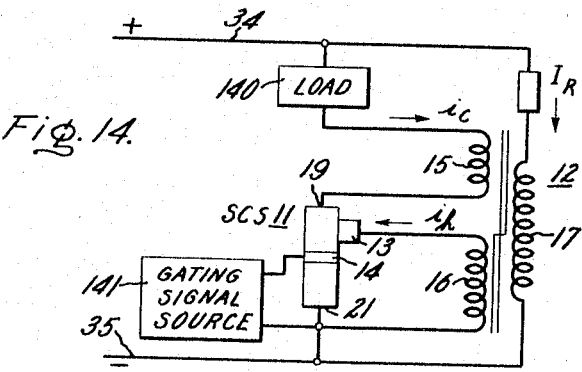
FIGURE 14 is a schematic circuit diagram of a simplified time ratio control power circuit employing the principles of the novel current limiting protective circuit made possible by the present invention.

FIGURE 14 of the dawings is a simplified time ratio control power circuit which operates in accordance with the principles of the new and improved current limit protective circuit made possible by the present invention. In the circuit arrangement of FIGURE 14, a load 140 is connected in series circuit relationship with the emitter-collector circuit of the silicon control switch 11 and the primary winding 15 of the saturable core transformer 12. Similar to the circuit arrangements of FIGURES 1 and 4, the secondary winding 16 of the saturable core transformer is connected to the hold terminal of SCS 11 and a gating signal source 141 is connected to the turn-on gate of SCS 11. Reset is achieved by reset current $I_R$ flowing in reset winding 17. By this arrangement, the SCS 11 will operate to chop the direct current potential applied across the power supply terminals 34 and 35 to any proportional value as determined by the frequency of the gating signal pulses supplied from the gating signal source 141.

In operation, a gating signal pulse supplied to the turn-on gate 14 of SCS 11 will cause the device to be turned on. Collector current $i_c$ flowing in the emitter-collector circuit through primary winding 15 will be transformed into the secondary winding 16 to produce a flowing current $i_h$ which will hold on the silicon control switch 11 after removal of the gating signal pulse in the turn-on gate 14. The SCS 11 is then held on for a period of time $t_{on}$ similar to that illustrated by the characteristic curve shown in curve $b$ of FIGURE 3, until such time that the saturable core transformer 12 saturates. Upon the core of the saturable core transformer 12 saturating, the SCS 11 is turned off. Reset current $I_R$ flowing in the reset winding 17 will reset the core of saturable core transformer 12 to its initial condition of saturation thereby returning the circuit to its initial operating condition ready for a new cycle of operation.

From the foregoing description, it can be appreciated that the present invention makes available a new and improved fast acting current limit circuit for use in protecting semiconductor power circuits of many different forms. The fast acting current limiting protective circuit is both simple and relatively inexpensive to manufacture and yet highly efficient in operation in that it requires no drain on the power circuit being protected. In addition to these features, the circuit provides effective isolation between the large current flowing in the power circuit being protected, and the current limit protective circuit itself.

Having described several embodiments of a new and improved current limit protective circuit constructed in accordance with the present invention, it is believed obvious that other modifications and variations of the present invention are possible in light of the above teachings. It is therefore to be understood that changes may be made in the particular embodiments of the invention described which are in the full intended scope of the invention as defined by the appended claims.

What I claim as new and desire to secure by Letters Patent of the United States is:

1. A current switch including in combination a silicon controlled switch having two load terminals, a turn-on gate and a hold-on gate, transformer means having at least inductively coupled primary and secondary windings, the primary winding being connected in series circuit relationship with the load terminals of the silicon controlled switch with the series circuit thus comprised being adapted to be connected across a source of electric potential, and the secondary winding of the transformer means being operatively coupled to the hold-on gate of the silicon controlled switch, and a gating signal source operatively coupled to the turn-on gate of the silicon controlled switch.

2. The combination set forth in claim 1 wherein the transformer means is a saturable core transformer.

3. A current switch including in combination a silicon controlled switch having two load terminals, a turn-on gate and a hold-on gate, transformer means having at least inductively coupled primary and secondary windings, the primary winding being connected in series circuit relationship with a load and the load terminals of the silicon controlled switch, the series circuit thus comprised being adapted to be connected across a source of electric potential, and the secondary winding of the transformer means being operatively coupled to the hold-on gate of the silicon controlled switch, and a gating signal source operatively coupled to the turn-on gate of the silicon controlled switch.

4. The combination set forth in claim 3 wherein the transformer means is a saturable core transformer.

5. A current limiting circuit including in combination a silicon controlled switch having two load terminals, a turn-on gate and a hold-on gate, a saturable core transformer having at least inductively coupled primary, secondary and reset windings, the primary winding of the saturable core transformer being connected in series circuit relationship with the load terminals of the silicon controlled switch with the series circuit thus formed being adapted to be connected across the terminals of a source of electric potential, the secondary winding of the saturable core transformer being operatively coupled to the hold-on gate of the silicon switch, and the reset winding of the saturable core transformer being operatively connected in the load current carrying circuit whose load current value is to be limited, and a gating signal source operatively coupled to the turn-on gate of the silicon controlled switch.

6. The combination set forth in claim 5 wherein the reset winding of the saturable core transformer is a single turn load current carrying conductor connected in circuit relationship with the load whose load current value is to be regulated.

7. A new and improved power circuit including in combination a load current carrying conductively controlled conducting device and a load connected in series circut relationship across a pair of power supply terminals that in turn are adapted to be connected across a source of electric potential, commutating circuit means operatively coupled across said load current carrying conductivity controlled conducting device for commutating off said device at desired intervals, said commutating circuit means including an auxiliary conductivity controlled conducting device for initiating the commutation operation, current limiting means operatively coupled to said auxiliary conductivity controlled conducting device for turning on said auxiliary conductivity controlled conducting device in response to a predetermined load current condition, said current limiting means comprising a silicon controlled switch having two load terminals, a turn-on gate and a hold-on gate, saturable core transformer means having at least inductively coupled primary and secondary windings, and coupling means operatively coupled to the control gate of the auxiliary conductivity controlled conducting device, the load terminals of the silicon controlled switch being connected in series circuit relationship with primary winding of the saturable core transformer means and the coupling means with the series circuit thus comprised being adapted to be connected across a source of electric potential, and the secondary winding of the saturable core transformer means being operatively coupled to the hold-on gate of the silicon controlled switch, load current sensing means operatively connected in circuit relationship with said load current carrying conductivity controlled conducting device and the load for sensing the value of the load current, said load current sensing means being operatively coupled to the saturable core transformer means in said current limiting means for initiating operation of said current limiting means in response to a predetermined load current flow condition, and gating signal means operatively coupled to the gate of said load current carrying conductivity controlled conducting device and to the turn-on gate of the silicon controlled switch for turning on said devices at predetermined intervals.

8. A new and improved power circuit including in combination a load current carrying conductivity controlled conducting device and a load connected in series circuit relationship across a pair of power supply terminals that in turn are adapted to be connected across a source of electric potential, commutating circuit means operatively coupled across said load current carrying conductivity controlled conducting device for commutating off said device at desired intervals, said commutating circuit means including an auxiliary conductivity controlled conducting device for initiating the commutation operation, current limiting means operatively coupled to said auxiliary conductivity controlled conducting device for turning on said auxiliary conductivity controlled conducting device in response to a predetermined load current condition, said current limiting means comprising a silicon controlled switch having two load terminals, a turn-on gate and a hold-on gate, a saturable core transformer having at least inductively coupled primary, secondary and reset windings, and a coupling transformer having its secondary winding operatively coupled to the control gate of the auxiliary conductivity controlled conducting device, the load terminals of the silicon controlled switch being connected in series circuit relationship with the primary winding of the saturable core transformer and the primary winding of the coupling transformer with the series circuit thus formed being adapted to be connected across the terminals of a source of electric potential, the secondary winding of the saturable core transformer being operatively coupled to the hold-on gate of the silicon switch, the reset winding of the saturable core transformer being comprised by a single turn load current carrying conductor operatively connected in series circuit relationship with the load current carrying conductivity controlled conducting device, and gating signal means operatively coupled to the turn-on gate of the silicon controlled switch and to the load current carrying conductivity controlled conducting device for turning on said devices at predetermined intervals.

9. A new and improved power circuit including in combination a load current carrying silicon controlled rectifier device, a filter inductance and a load connected in series circuit relationship in the order named across a pair of power supply terminals that in turn are adapted to be connected across the source of electric potential, a coasting rectifier connected in parallel circuit relationship with the load and filter inductance, commutating circuit means comprised by a commutating capacitor and a saturable autotransformer having its secondary winding portion connected in series circuit relationship with the commutating capacitor across the load current carrying silicon controlled rectifier device, the primary winding portion of the saturable autotransformer being connected in series circuit relationship with the load current carrying silicon controlled rectifier device, the filter inductance and the load at a point intermediate the load current carrying silicon controlled rectifier device and the filter inductance, an auxiliary silicon controlled rectifier device interconnected between the junction of the commutating capacitor and the primary winding portion of the saturable autotransformer and the juncture of the load current carrying silicon controlled rectifier device and the secondary winding portion of the saturable autotransformer for initiating commutation of the load current carrying silicon controlled rectifier device, current limiting means operatively coupled to the control gate of the auxiliary silicon controlled rectifier device for turning on the auxiliary silicon controlled rectifier device to thereby initiate commutation of the load current carrying silicon controlled rectifier device, said current limiting means including in combination a silicon controlled switch having two load terminals, a turn-on gate and a hold-on gate, a second saturable core transformer having at least inductively coupled primary, secondary and reset windings, the primary winding of the second saturable core transformer being connected in series circuit relationship with the load terminals of the silicon controlled switch and the primary winding of a coupling transformer with the series circuit thus formed being adapted to be connected across the terminals of a source of electric potential, the secondary winding of the coupling transformer being operatively connected to the control gate of the auxiliary silicon controlled rectifier, the secondary winding of the second saturable core transformer being operatively coupled to the hold-on gate of the silicon switch, and the reset winding of the second saturable core transformer being comprised by a single turn load current carrying conductor connected in the load current carrying circuit including the load current carrying silicon controlled rectifier device, and gating signal means operatively coupled to the turn-on gate of the silicon controlled switch and to the control gate of the load current carrying silicon controlled rectifier device for simultaneously turning on said devices at predetermined intervals.

10. The combination set forth in claim 9 further characterized by a feedback diode connected in parallel circuit relationship with the load current carrying silicon controlled rectifier in a reverse polarity sense.

11. The combination set forth in claim 9 wherein the load current carrying silicon controlled rectifier device is replaced by a load current carrying triac and the circuit is further characterized by additional gating circuit means for gating on said load current triac in the reverse feedback current direction.

12. A new and improved power circuit including in combination a power transistor having an emitter-collector circuit and an emitter-base circuit, a load connected in series circuit relationship with the emitter-collector of the power transistor with the series circuit thus formed being connected across a pair of power supply terminals that in turn are adapted to be connected across a source of electric potential, a saturable core transformer having inductively coupled primary and secondary windings, the primary winding of the saturable core transformer being connected in the emitter-collector circuit of the power transistor and the secondary winding of the saturable core transformer being connected in the emitter-base circuit of the power transistor, current limiting circuit means operatively coupled to said power transistor for turning off the power transistor in response to an overcurrent condition, said current limiting circuit means comprising a silicon controlled switch having two load terminals, a turn-on gate and a hold-on gate, second saturable core transformer means having at least inductively coupled primary and secondary windings, the primary winding of the second saturable core transformer means being connected in series circuit relationship with the load terminals of the silicon controlled switch and coupling means to the power transistor with the series circuit thus comprised being adapted to be connected across a source of electric potential, and the secondary winding of the second saturable core transformer means being operatively coupled to the hold-on gate of the silicon controlled switch, and gating signal means operatively coupled to the turn-on gate of the silicon controlled switch for turning on the switch at desired intervals.

No references cited.

JOHN F. COUCH, *Primary Examiner.*

M. L. WACHTELL, *Assistant Examiner.*